United States Patent [19]

Brucker

[11] Patent Number: 4,471,562

[45] Date of Patent: Sep. 18, 1984

[54] SNAIL PROTECTIVE DEVICE

[76] Inventor: Milton Brucker, 10110 Empyrean Way, #302, Los Angeles, Calif. 90067

[21] Appl. No.: 414,653

[22] Filed: Sep. 3, 1982

[51] Int. Cl.³ ............................................. A01M 1/22
[52] U.S. Cl. ......................................... 43/108; 47/24
[58] Field of Search ...................... 43/108, 107; 47/23, 47/24, 25, 32; 256/11

[56] References Cited

U.S. PATENT DOCUMENTS

| 183,879 | 10/1876 | Ackley | 47/30 |
| 392,347 | 11/1888 | Krause | 256/111 |
| 481,311 | 8/1892 | Smith | 43/108 |
| 592,640 | 10/1897 | Orner | 47/30 |
| 1,101,145 | 6/1914 | Poenicke | 47/24 |
| 1,108,764 | 8/1914 | Kull | 47/24 |
| 1,512,618 | 10/1924 | McDonald | 47/24 |

FOREIGN PATENT DOCUMENTS

| 656563 | 2/1938 | Fed. Rep. of Germany | 47/24 |
| 597747 | 4/1978 | Switzerland | 47/32 |
| 504011 | 4/1939 | United Kingdom | 43/108 |

Primary Examiner—Kuang Y. Lin
Assistant Examiner—Marc Hodak
Attorney, Agent, or Firm—Herzig, Schaap & Yanny

[57] ABSTRACT

A snail protective barrier device. A band is provided of relatively thin foil material. Spaced slits are formed in its edges and flaps or webs are bent out horizontally from the strip of material to be in spaced relation relative to each other. The band with the horizontally extending flaps may be utilized in a straight line position; or in a circular, square or other configuration. Climbing insects, particularly snails, are prevented from passing the barrier by being unable to traverse the horizontal surfaces of the extending flaps or webs, particularly the underside surfaces.

12 Claims, 8 Drawing Figures

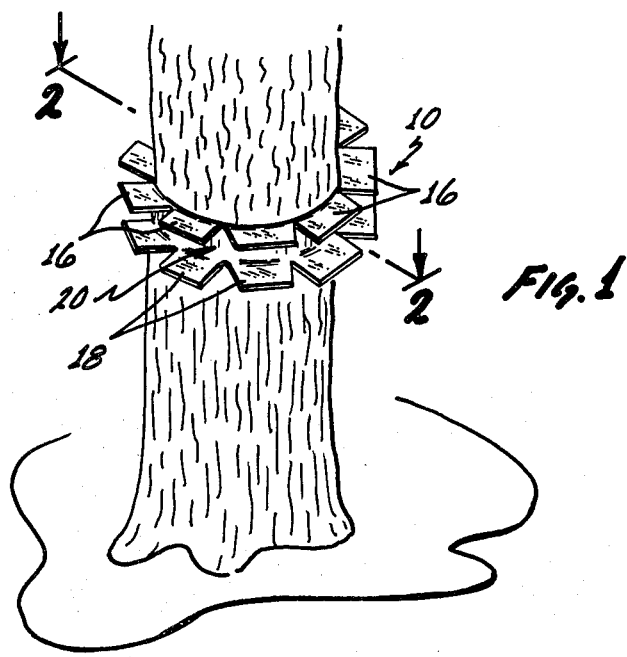
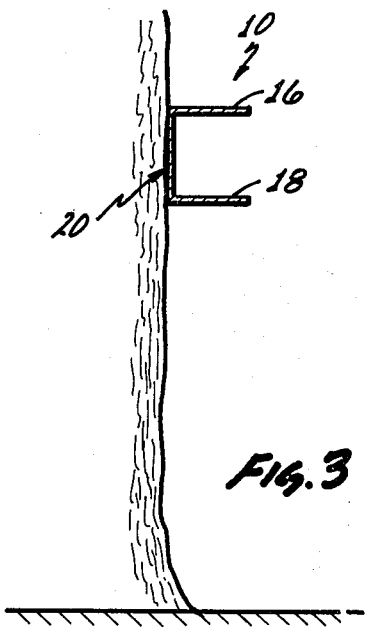
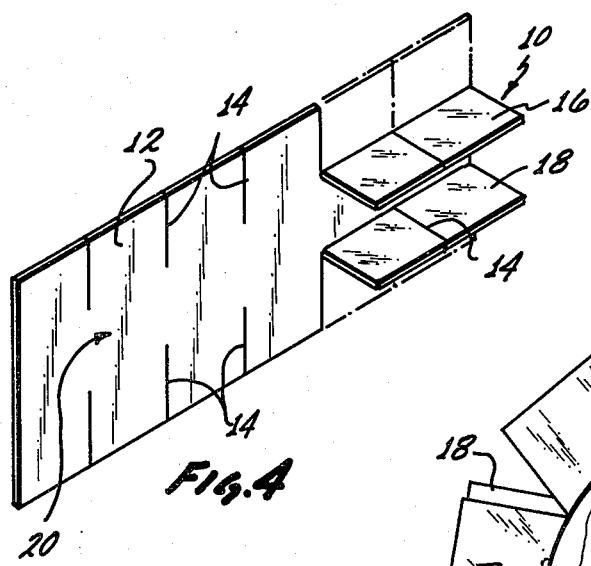
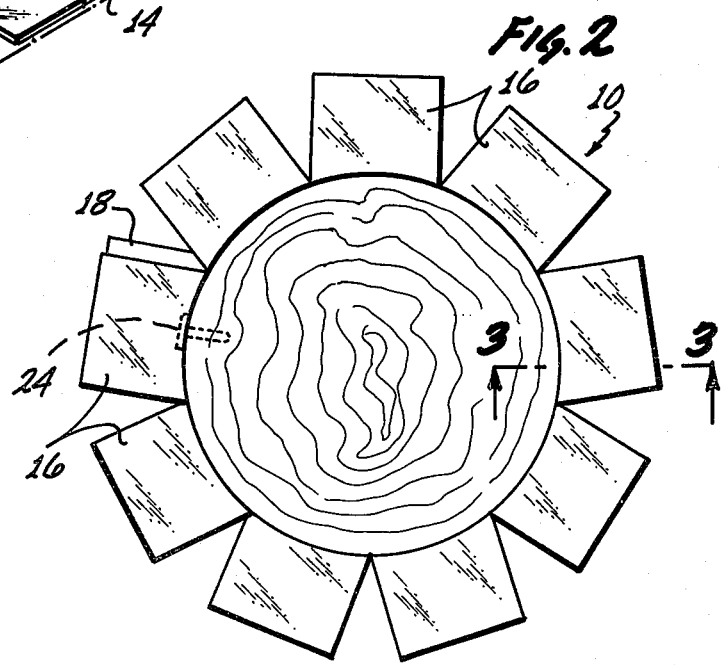

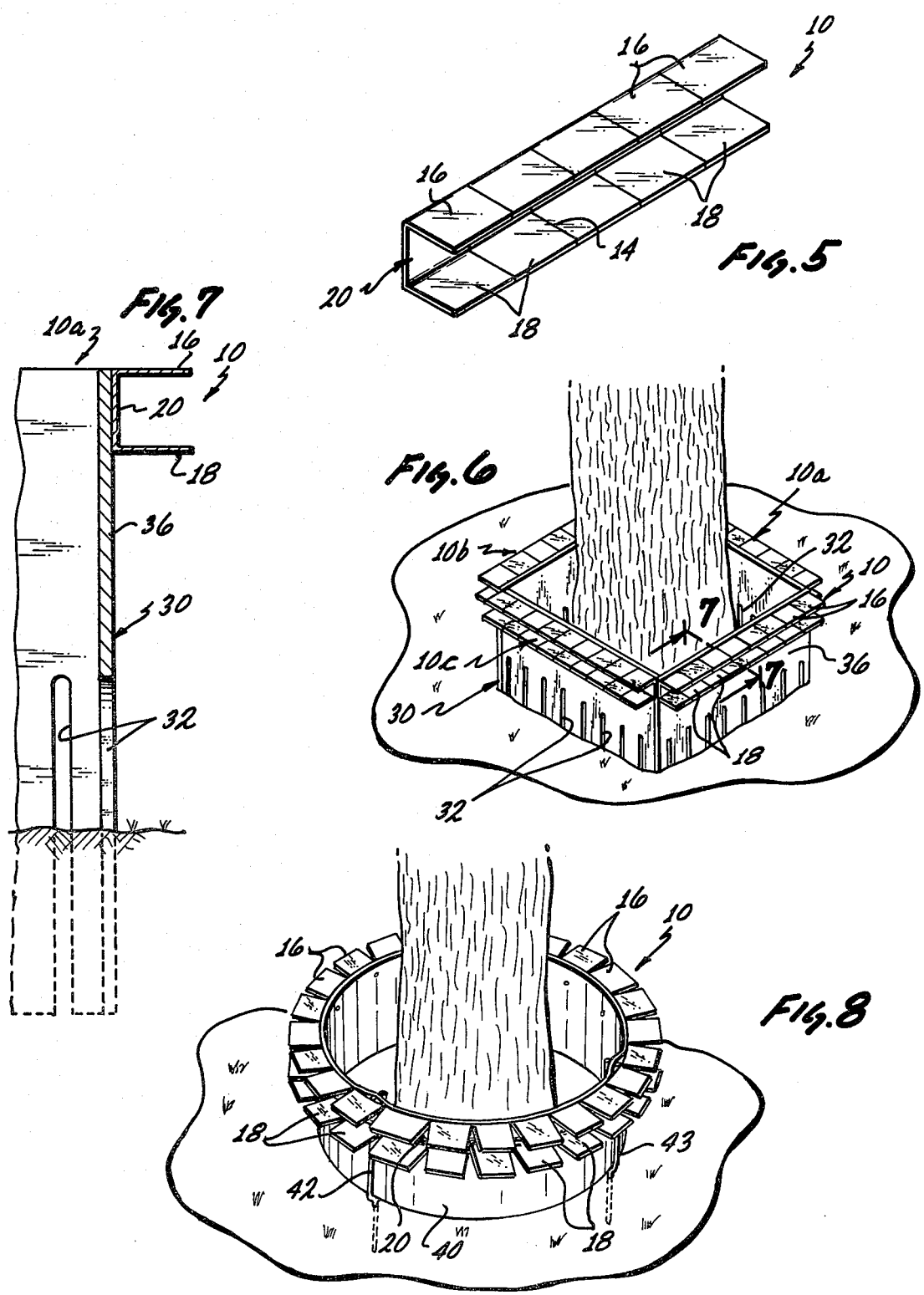

SNAIL PROTECTIVE DEVICE

BACKGROUND OF THE INVENTION

1. Field of the Invention

The field of the invention relates to control of snail population of various species of snails in various environments that may cause damage to foliage and growing materials. The invention is particularly concerned with a unique type of physical barrier having the capability of preventing the passage of snails past the barrier.

2. Description of the Prior Art

Snails constitute a serious problem constituting pests in various areas such as agricultural plots, and other environments such as plants in nurseries, hot houses, trees and other growing vegetation. The problem becomes more intense where the snail population may be very dense as it is in certain geographical areas, the density being as high as 100–1000 specimens per square meter. The damage that snails do is serious. They feed on the leaves and the fruit or they may just contaminate the crop that they have infested. In certain areas substantial amounts of money have been spent attempting to control the snails by expensive baits or sprays.

Snails will climb trees in order to get at the leaves and the fruit of the trees. Once they have nibbled at the fruit it is not marketable because it is damaged. In fact, the problem of snails in orchards is an enormous one. They crawl up the trees and eat the leaves and the fruit which is not then marketable as stated. It has been a tremendous problem as indicated in the foregoing. Attempts have been made to use poison. However, it is necessary to water the trees and/or vegetation and when the water is put on to the trees or vegetation it dissolves the poison which loses its effectiveness. Very substantial efforts have been made in this matter to meet the snail problem. In orange, lemon and grapefruit groves this is the most serious problem that exists. The problem is present with respect to rose bushes, plants and other growing items.

Attempts have been made in the prior art at using physical barriers because of the economic importance of attempting to resist the snail infestation particularly in small highly profitable plots in nurseries, vegetables for export, and flower hot houses. Many of such plots are in existence. It has been found that the use of an ordinary fence or galvanized net material as a barrier was deficient for the purposes. Materials that have been tried have been very expensive. It has been found that with an ordinary typical type of barrier material or fence the snails could climb right over it, gravity not being sufficient to prevent this. Even where copper has been used in the past the snails would climb over the barrier leaving slime on the copper which would quickly result in a chemical reaction, that is, oxidation.

Other attempts in the prior art include the use of thin sheet material formed as a sort of umbrella, but it was found that the snails would crawl right over the device. Attempts have been made to use a water trough, for example, around a tree but it has been found that the snails would crawl through the water on the bottom of the trough and thereby get by the barrier. Even the use of a bed of carpet tacks has been tried, but it was found that the snails would crawl right over the points and despite the effect of gravity would make their way to the tree or other object sought to be protected.

The herein invention, exemplary forms of which are described in detail hereinafter has been originated to overcome the problems associated with snails to overcome the deficiencies referred to and to provide an apparatus or device having the capability of preventing snails from having access to materials that they would otherwise destroy.

Background patents include U.S. Pat. Nos. 33,332; 254,135; 2,999,479; 389,047; 642,064; 1,101,145; 1,335,845; 1,512,618; 1,674,118; and 1,528,669.

SUMMARY OF THE INVENTION

Preferred exemplary forms of the invention are described in detail hereinafter.

In one preferred exemplary form of the invention it is constructed in the form of a barrier device which can be wrapped around a tree and attached in a manner to prevent snails from climbing the tree. In this form of the invention it is provided with a collar or band of flexible material, more particularly, copper which can be wrapped around a tree and fastened. The article is formed from a band of material of desired width and by making spaced slits on opposte sides of the band. The flaps between the slits are then bent outwardly, preferably at a right angle on the band to form a circle of extending flaps or leaves which may also be characterized generally as a flange shaped member, at both the top and the bottom of the band to form a protective barrier to prevent the passage of snails which are not able to pass through the spaces between the flaps or leaves. The band is then wrapped around the tree and the ends fastened by being stapled or by similar means. With this construction the snails do not have opportunity to leave any slime on the copper material and oxidation is thereby prevented. The material is relatively soft and the attachment of the ends of the band allows expansion of the tree as it grows.

The leaves of flaps on the band do not allow the snails to pass the barrier. In a preferred form of the invention as described the product may be easily manufactured from copper foil cut into widths of perhaps three inches and then the spaced slits are made on opposite sides. As stated, the product can be attached to a tree by means of an automatic stapler, stapling each end of the piece of the material to the tree. With this construction with the leaves or flaps bent out at a right angle there is provided approximately five inches of copper surfaces from a three inch width of copper that would have to be traversed by a snail in order to get by. That is, in order for a snail to crawl past the barrier the snail would have to traverse both sides of the two leaves extending at right angles including the part of the band between the leaves. This could provide a total distance of approximately five inches. When the snails climb the tree they cannot crawl out on the underside of the flaps or leaves on a barrier band because of gravity. Thus, they cannot leave any slime on the underside of the horizontal flaps and they cannot leave slime on it. The snails cannot get between them.

In another form of the invention it may be constructed in the form of a fence which may be formed in a square or circular or other configuration placed around a tree or other material to be protected from the snails. In this form of the invention there is provided a fence formed of wood, plastic or metal the bottom part of which is embedded in the ground the fence being, for example, from 6 to 8 inches in height. In the lower part of the barrier fence are slits 1/16 inch to ⅛ inch wide to allow for water drainage through the barrier fence. At the top of the barrier fence and attached to it there is a copper band or barrier constructed like that described in the foregoing, which is preferably wrapped around a tree trunk and held. In this form of the invention the barrier is preferably formed of copper and attached to the upper part of the fence. As in the previous embodiment it has tabs or flaps extending at right angles with slits between the tabs. In a straight line or square configuration the tabs or leaves would not produce an angular space between them but it is preferably to have the slits so as to make it easier to form the top barrier elements extending out at right angles to the base or band part of the barrier.

In the light of the foregoing, the primary object of the invention is to realize an improved barrier device having the capability of preventing the passage of snails for the protection of trees, plants, fruit, and any other growing materials.

A further object of the invention is to realize a barrier device for snails which is the form of a barrier member having a predetermined width and having extending from it a plurality of flaps or webs at substantially a right angle so that a snail would have to traverse both sides of an extending web or leaf in order to pass the barrier.

A further object is to realize barrier devices as in the foregoing which are constructed of copper.

A further object is to realize a barrier device as in the foregoing which includes a lower fence part which may be formed of wood, plastic, metal, or other material and which includes a collar part having a plurality of flaps or leaves extending at right angles from the collar part.

A further object is to realize a barrier device as in the foregoing, wherein the barrier includes a collar part of predetermined width, the collar part having a first series of flaps or leaves extending at right angles from it and a second series of flaps or leaves extending at right angles from it.

Further objects and additional advantages of the invention will become apparent from the following detailed description and annexed drawings.

BRIEF DESCRIPTION OF THE DRAWINGS

FIG. 1 is a pictorial view of a preferred form of the invention applied to a tree;

FIG. 2 is a sectional view taken along the line 2—2 of FIG. 1;

FIG. 3 is a cross sectional view taken along the line 3—3 of FIG. 2;

FIG. 4 is an illustrative isometric view showing the manner of formation or construction of the barrier device of FIGS. 1, 2, and 3;

FIG. 5 is an isometric view of a form of the barrier device as utilized in the form of the invention shown in FIGS. 6, 7, and 8;

FIG. 6 is an isometric view of a modified form of the invention which includes a barrier part at the top of a fence;

FIG. 7 is a sectional view taken along the line 7—7 of FIG. 6;

FIG. 8 is an isometric view of another modified form of the invention which is similar to that of FIG. 6, but which is of circular configuration.

DESCRIPTION OF PREFERRED EMBODIMENTS AND BEST MODE OF PRACTICE

FIGS. 1 through 5 of the drawings illustrate one preferred form of the invention and best mode of practice. This embodiment of the invention illustrates its utilization as a protective barrier for a tree. A protective barrier device is designated as a whole by the numeral 10 in FIG. 1. The preferred manner of fabrication and illustration of the barrier is illustrated in FIGS. 3–5.

The barrier is initially formed from a band or stip of material and this is preferably copper as illustrated at 12 in FIG. 4. The material is preferably a relatively thin foil copper material. The band 12 might have a width of three inches or more. Spaced slits are cut into the edges of the material on both sides as illustrated at 14, leaving an intermediate part in between the slits. This leaves flaps, leaves, or webs, which may also be characterized generally as a flange shaped member, as designated at 16 and 18 in between the slits 14. These flaps or webs are bent outwardly, preferably at a right angle so as to produce a configuration as shown in FIGS. 3 and 5. The portion of the band 12 in between the webs is designated by the numeral 20. The band initially might have a width of, for example, three inches from which the webs 16 and 18 are bent outwardly as shown in FIGS. 3 and 5.

The strip as illustrated in FIGS. 1 and 3 is wrapped around the trunk of the tree, for example, as seen in FIG. 1. The ends of the band can then be simply stapled together or they can be fastened directly to the tree by a fastener such as shown at 24 in FIG. 2.

The capability of the barrier of the invention will be readily understood from the foregoing by those skilled in the art. A snail, in order to pass the barrier, has to crawl outwardly on the underside of the flap, such as 18, then inwardly on this flap, then upwardly on the surface of the intermediate part 20, then outwardly on the underside of flap 16 and then inwardly on the upper side of that flap. It has been found that this barrier construction effectively prevents snails from passing it. It is to be observed that with this construction the snail would have to traverse copper surfaces of approximately five inches or more in traversing both sides of the flaps 16 and 18 and the vertical surface 20. This construction effectively prevents the deposition of slime on the copper surfaces of the barrier by the snails. Gravity, of course, inhibits attempts of a snail to crawl outwardly on the undersurfaces of the flaps 16 and 18.

FIGS. 6 and 7 illustrate another embodiment of the invention and FIG. 8 illustrates a modification of the embodiment of FIGS. 6 and 7. These embodiments illustrate the general or universal application of the invention as a barrier to snails.

FIGS. 6 and 7 illustrate the invention set up in a square configuration. Numeral 30 designates a barrier fence which may be constructed of wood, plastic, or metal, preferably of relatively thin gauge. This barrier fence may by way of example be from 6 to 8 inches in height. Spaced slots or slits 32 are formed in the bottom of the fence to allow drainage of water from the interior. The lower part of the fence is embedded in the ground a small amount such, as for example, 2 or 3 inches as illustrated in FIG. 7. In the square configuration shown in FIG. 6 the fence, of course, has four sides one of which is designated by the numeral 36. Attached to the top of the fence part 36 is a barrier member 20, which is like that of the previous embodiment which is attached to the top of the fence as illustrated in FIG. 7 with the flaps or webs 16 and 18 extending from the intermediate part 20 at preferably a right angle as shown. A similar section of barrier material is provided at the top of each section of fence 36 as designated by the characters 10a, 10b, and 10c.

From the foregoing it may be observed that the present embodiment of the invention may be constructed in any desired shape and positioned to provide a barrier around any particular desired area, such as, an agricultural plot, plants in nurseries or hot houses, or any other types of growing vegetation.

FIG. 8 shows a modification of the form of the invention shown in FIG. 6 in which the barrier is of circular rather then square configuration. In this form of the invention a fence is provided as designated at 40 which is like that of FIGS. 6 and 7. The lower part of the fence can be embedded in the ground as in FIGS. 6 and 7 or it may be secured by way of stakes as designated at 42 and 43 which extend into the ground and have upper bracket parts which engage the fence 40.

In this form of the invention a barrier unit 10, like that of the previous embodiments is positioned to encircle the upper part of the fence 40 and can be attached or secured to it in any convenient manner such as by stapling or otherwise.

It will be observed that in this form of the invention which is of circular configurations flaps or webs 16 and 18 are separated by the part 20 and there are triangular spaces between them as appear in FIGS. 1 and 2. These spaces are of a size such that snails cannot find there way between them.

It can be pointed out that with respect to all forms of the invention that even if snails attempted to traverse the underside of a web, such as the web 18, by crawling over each other they are sufficiently inhibited or detered that they do not succeed because of the fact that the same attempt would have to be made underneath the next horizontal web, such as the web 16.

From the foregoing, those skilled in the art will readily understand the nature and construction of the invention and the manner in which it achieves and realizes all of the objectives and capabilities as set forth in the foregoing. The invention is particularly significant from the stand point of ifs effectiveness for its purposes and its ecomony of installation and utilization.

The foregoing disclosure is representative of preferred forms of the invention and is to be interpreted in an illustrative rather than a limiting sence, the invention to be accorded the full scope of the claims appended hereto.

I claim:

1. A barrier to prevent the passage of snails, and the like, comprising in combination, the barrier consists of copper material and is adapted to form a collar means when installed, means extending from said collar means including a horizontally extending flat web member, the relation between said collar means and said member being such that in order for a snail to traverse the barrier the snail has to traverse the underside of said web material, and the upperside of said member.

2. A barrier as in claim 1, said collar means including a single strip of relatively thin foil material having spaced slits formed in its opposite side portions with the edges of said slits defining the lateral sides of said web members, said web members being bent outwardly with respect to the strip.

3. A barrier as in claim 1, wherein said collar means with the horizontally extending web member is positioned and fastened around a plant, and the like, yieldable means for fastening the ends of the strip together to allow the collar means to expand as the plant grows, said web member extending outwardly radially.

4. In combination: a barrier to prevent the passage of snails, and the like, the barrier consists of copper material and has an edge, means along the edge of the barrier for permitting bending of the same into a flange shaped means, said means including elements extending from the barrier and substantially normal thereto, said elements having substantially horizontal surfaces lying in substantially the same plane, the said elements being positioned close enough together to prevent the passage of snails between them, the relation between said barrier and said elements being such that in order for a snail to pass the barrier it is necessary for the snail to traverse the underside of at least one horizontal element and said edge and then to traverse the upperside of a horizontal element.

5. A combination as in claim 4, wherein said elements are constructed to form an enclosing barrier to prevent passage of an insect at any point in the barrier.

6. A combination as in claim 4, wherein the barrier is in the form of a band having extending from it a first series and a second series of said normally extending elements, said elements in said first series lying substantially in a plane, the planes of each series being substantially parallel and spaced apart.

7. A combination as in claim 6, wherein the elements of each series are formed by portions bent out to normal position from slits in the edge portions of said band.

8. A combination as in claim 7, wherein said band is in a continuous circular configuration, said elements extending radially from the circular configuration with spaces in between edges of adjacent elements.

9. In combination:
a barrier to prevent the passage of snails, and the like, the barrier constructed to surround a plant when installed, the barrier including a vertically positioned fence member,
means extending from said fence member including a horizontally extending flat web member consisting of copper material, the relation between said vertically positioned fence member and said web member being such that in order for a snail to traverse the barrier, the snail has to traverse the underside of said web member; the upperside of said web member, and said fence member, said extending web member being secured to the approximate upper edge portion of said fence member with said web members extending horizontally therefrom.

10. A combination as in claim 9 wherein said fence member is substantially square in configuration.

11. A combination as in claim 9, wherein said fence member is substantially circular in configuration.

12. A combination as in claim 9 wherein said fence member is adapted to have its lower part embedded in the ground.

* * * * *